United States Patent [19]

Yamagishi et al.

[11] Patent Number: 4,841,272

[45] Date of Patent: Jun. 20, 1989

[54] SEMICONDUCTOR DIFFUSION STRAIN GAGE

[75] Inventors: Hideaki Yamagishi; Mayumi Nomiyama, both of Tokyo, Japan

[73] Assignee: Yokogawa Electric Corporation, Tokyo, Japan

[21] Appl. No.: 89,504

[22] Filed: Aug. 26, 1987

[30] Foreign Application Priority Data

Sep. 25, 1986 [JP] Japan .................................. 61-226632

[51] Int. Cl.$^4$ ................................................. G01L 1/22
[52] U.S. Cl. ........................................ 338/2; 29/621.1; 338/5
[58] Field of Search .................................... 338/2–5; 29/621.1, 569.1, 25.35

[56] References Cited

U.S. PATENT DOCUMENTS 4,510,671 4/1985 Kurtz et al. ..................... 338/5 X Primary Examiner—E. A. Goldberg
Assistant Examiner—M. M. Lateef
Attorney, Agent, or Firm—Moonray Kojima

[57] ABSTRACT

A strain gage wherein neutral impurity atoms forming neither donors nor acceptors are doped in a silicon substrate and a diffused resistance element is formed in the doped region, thereby decreasing the temperature coefficient of resistivity without changing the resistivity and decreasing the temperature coefficient of piezoresistance coefficient with no effect on the piezoresistance coefficient which governs the sensitivity of the strain gage.

3 Claims, 5 Drawing Sheets

SEMICONDUCTOR DIFFUSION STRAIN GAGE

BACKGROUND OF THE INVENTION

1. Field of the Invention

This invention relates to an improvement in the temperature dependence of a silicon semiconductor diffused strain gage.

2. Description of the Prior Art

A conventional pressure sensor is shown in FIG. 1 wherein impurity atoms are diffused in a silicon substrate to form a strain gage. An n-type silicon (Si) substrate 1 and a p-type diffused resistance 2 is formed, for example, by diffusion or ion implantation. An insulation layer 3, made of SiO$_2$, is formed over the diffused resistance layer, then contact holes 4a–4d and electrodes 5 are disposed in the insulation layer 3. A diaphragm 8 of about 20 to 50 μm thickness is formed by etching a portion of the rear face of the silicon substrate 1.

The resistivity of such a diffused resistance (resistance value per unit cross sectional area and unit length) ρ can generally be represented by the following equation (1):

$$\rho = 1/(e(u_{po} \cdot P + u_{no} \cdot n)) \tag{1}$$

wherein e is the elementary electric charge; $u_{po}$ is the positve hole mobility (quantity indicating the velocity of positive holes upon applying unit voltage between electrodes); $u_{no}$ is the electron mobility (quantity indicating the velocity of electrons upon applying unit voltage between electrodes); P is the positive hole density; and n is the electron density.

Assuming that the diffused resistance 2 shown in FIG. 1 is formed with a kind of impurity atoms forming acceptors, which is uniformly distributed, equation (1) can be expressed by the following approximate formula (2):

$$\rho = 1/(e \cdot u_{po} \cdot P) \tag{2}$$

It can be seen from equation (2) that the value of resistivity ρ is dependent on the positive hole mobility $u_{po}$ and the positive hole density P. That is, it can be considered that the temperature dependence of resistivity consists of temperature dependence of the positive hole mobility $u_{po}$ and the temperature dependence of positive hole density P.

It is known that positive hole density P takes substantially a constant value within a range of from −100° C. to 200° C., which is referred to as a saturation region, and is equal to the acceptor density in the portion of the diffused resistance layer 2. Accordingly, when the semiconductor strain gage is used within the temperature range as described above, the temperature dependence of the resistivity is determined by the temperature dependence of positive hole mobility $u_{po}$.

It can be stated that a greater positive hole mobility $u_{po}$ means that the positive holes move through the diffused resistance 2 while undergoing no substantial scattering, whereas a smaller $u_{po}$ means that the positive holes are less movable in the direction of the electric field due to the substantial scattering.

The scattering mechanism hindering the movement of the positive holes can include (1) scattering due to thermal vibration of the lattice atoms constituting crystals (the mobility is referred to as a lattice scattering mobility and represented by $u_L$), and (2) scattering due to ionized acceptor atoms (the mobility is referred to as an ionized impurity scattering mobility and is expressed by $u_I$).

The positive hole mobility $u_{po}$ in the case where the scattering mechanisms are present together is represented as follows:

$$1/u_{po} = 1/u_L + 1/u_I \tag{3}$$

That is, the temperature dependency of the positive hole mobility $u_{po}$ is dependent on the lattice scattering mobility $u_L$ and the ionized impurity scattering mobility $u_I$. The temperature dependency of $u_L$ and $u_I$ can be represented by the following equations:

$$u_L \alpha (m^*)^{-2/5} \cdot T^{-3/2} \tag{4}$$

$$u_I \alpha (m^*)^{-\frac{1}{2}} \cdot T^{3/2}/N_I \tag{5}$$

wherein $m^*$ is the effective mass of positive hole or electron; $N_I$ is the density of impurity doped in the diffused resistance (hereinafer referred to as the acceptor density); T is the absolute temperature (°K.).

FIG. 2 is a view depicting the relationship between the positive hole mobility $u_{po}$ (cm$^2$/V.sec) and the temperature (°K.) obtained by substituting equation (4) and equation (5) into equation (3). It shows the characteristic curve at each acceptor density $N_I$ (wherein $N_i = 1.3 \times 10^{18}$, $2.7 \times 10^{18}$ cm$^{-3}$) within the range of the absolute temperature T=100 to 600° K.

FIG. 3 corresponds to the hatched area in FIG. 2 and shows the characteristic curve at each acceptor density $N_I$ (wherein $N_I = 10^{14}$, $10^{16}$, $10^{17}$, $10^{18}$, $10^{19}$ cm$^{-3}$) within the range of absolute temperature T=223°–473° K.

Referring to the two curves in FIG. 2, the portion shown by the dotted chain, wherein positive hole mobility is increased along withe increase in temperature, is a region wherein $u_I$ represented by equation (5) is predominant. On the other hand, the portion represented by the solid line, wherein positive hole mobility is decreased along with increase in temperature, is a region wherein $u_L$ represented by equation (4) is predominant.

FIG. 3 is an enlarged view of a protion near room temperature (about 300° K.) wherein $u_L$ is perdominant and it can be seen from the drawing that although the effect of $u_I$ becomes significant as acceptor density $N_I$ is increased and positive hole mobility $u_{po}$ is lowered, it has less temperature dependence. That is, although resistivity ρ shown by the equation (2) decreases, variation caused by the temperature change decreases.

FIG. 4 shows the relationship between temperature and the resistance normalized by the value at 25° C. and the variation (%) while temperature is varied from 25° C. to 125° C. using a p-type diffused resistance of 3 μm depth (sheet resistivity is 50, 100, 150, 200, 500 Ω/☐) to an n-type Si substrate.

In the case of a bipolar IC (integrated circuit), the resistance value used is generally from 110 to 200 Ω/☐. It can be seen from FIG. 4 that the temperature dependence of resistivity within this range is as high as about 0.2%/degree. By doping acceptor impurity $N_I$ in about $10^{19}$ cm$^{-3}$, although temperature dependency is decreased, the resistivity ρ is also lowered as shown in FIG. 3. That is, when calculating resistivity ρ according to equation (2) assuming the positive hole density P=$10^{19}$ cm$^{-3}$, electric charge $e = 1.6 \times 10^{-19}$ and the positive hole mobility $u_{po}=30$ (at $N_I=10^{19}$ cm$^{-3}$ and 298° K. (i.e. 25° C.) in FIG. 3), $\rho$ is as small as $$\rho=1/(1.6\times10^{19}\times30\times10^{19})=0.02\ \Omega cm.$$

It is difficult to apply such a low resistivity to diffused resistance since the length of the resistance should be increased or the width of the resistance should be decreased, for example.

In the conventional semiconductor strain gage, the problem of great temperature dependence of the resistivity (the temperature coefficient of resistivity) is overcome with a method of offsetting such a variation by using a differential system, such as a bridge circuit. However, if there is any unbalance between the resistances in the bridge circuit complete offset is impossible. Further, in addition to the above problem, such a resistance has a temperature coefficient of the piezoresistance coefficient, that is, the sensitivity as a strain gage drifts, depending on the temperature. Accordingly, complex temperature compensation circuits have been connected to the subsequent stages.

Thus, it can be definitely stated that the prior art devices have many deficiencies and disadvantages.

SUMMARY OF THE INVENTION

Accordingly, an object of the invention is to overcome the aforementioned and other deficiencies and disadvantages of the prior art.

Another object of the invention is to decrease the temperature coefficient of piezoresistance coefficient without affecting the piezoresistance coefficient which governs the sensitivity of the strain gage, and to decrease the temperature coefficient of resistivity of the resistivity.

The foregoing and other objects and features of the invention are attained by doping neutral impurity atoms forming neither donors nor acceptors in a silicon substrate and forming a diffused resistance in the doped region.

DETAILED DESCRIPTION OF PREFERRED EMBODIMENTS

Figure 1:
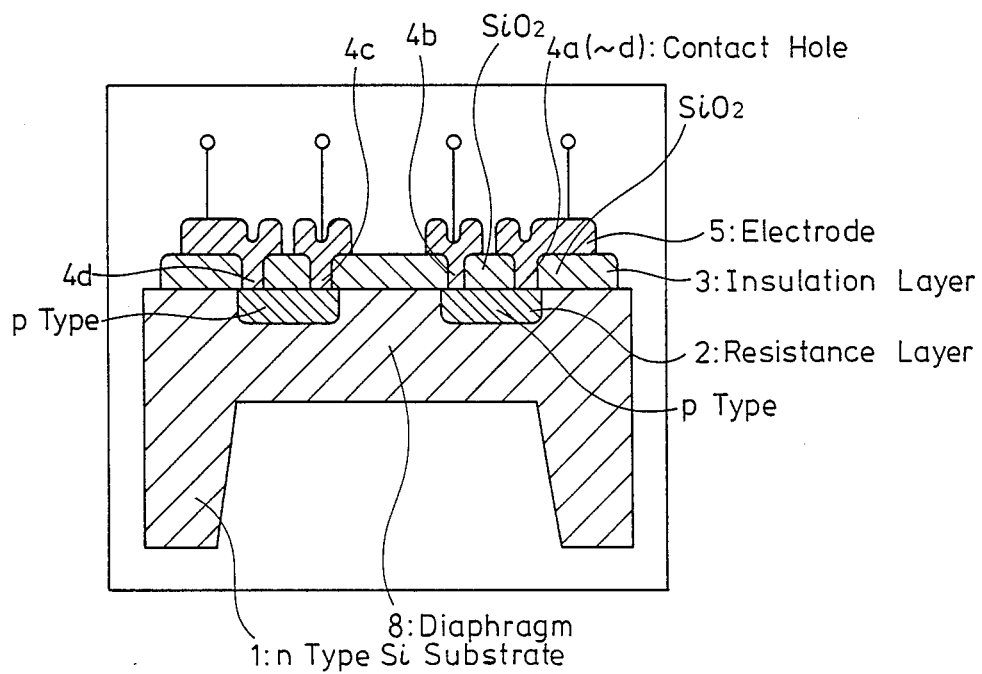
FIG. 1 is a cross sectional view depicting a conventional strain gage.
Figure 2:
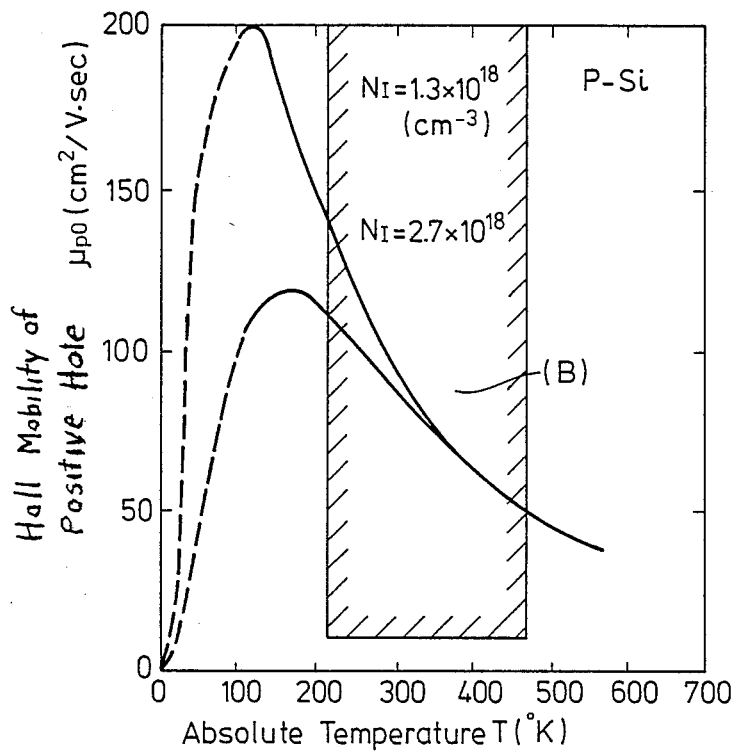
FIGS. 2 and 3 are graphs depicting the relationship between Hall mobility of positive holes and the absolute temperature.
Figure 3:
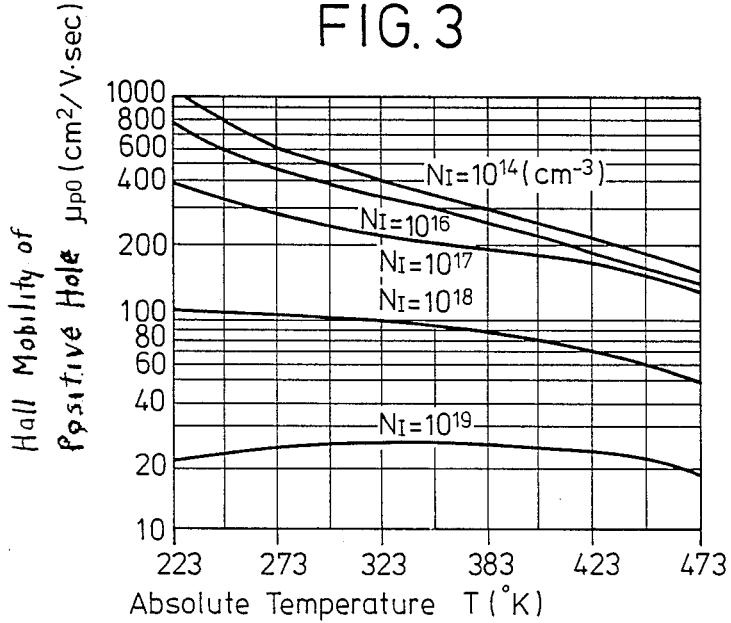
Figure 4:
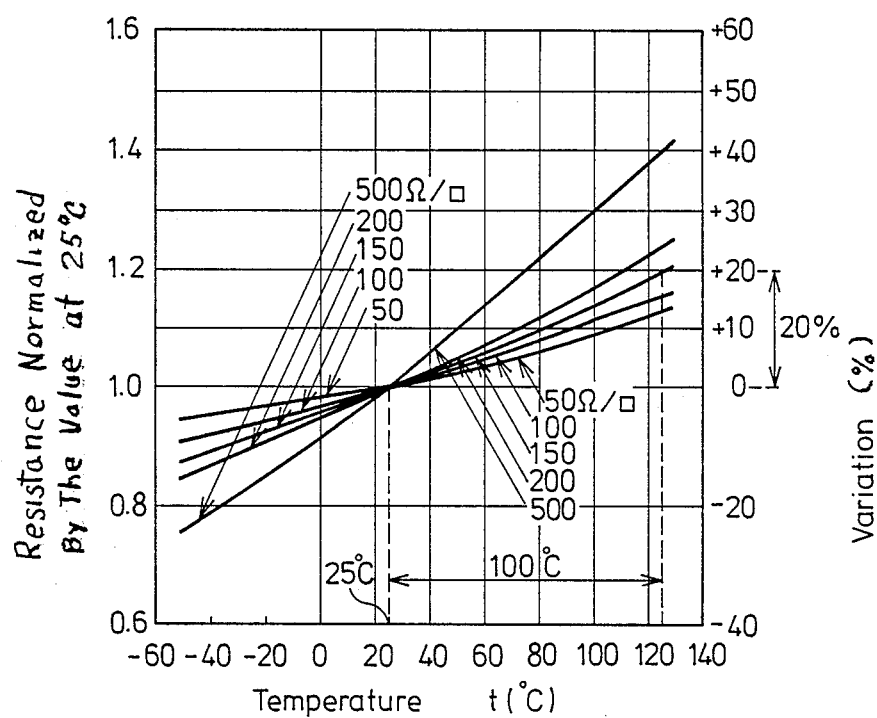
FIG. 4 is a graph depicting variation of resistance normalized by the value at 25° C. (measured at left side), variation (measured at right side) and ambient temperature drift.
Figure 5:
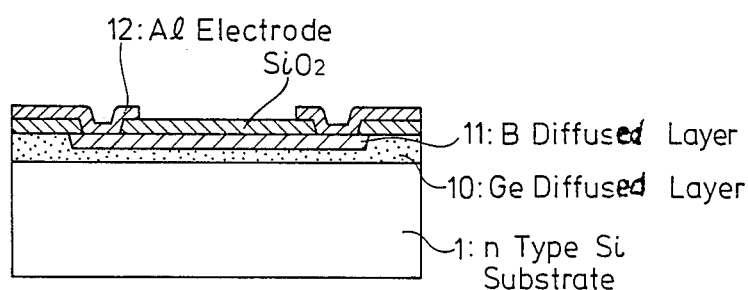
FIG. 5 is an elevational cross sectional view depicting an illustrative embodiment of the invention.

FIG. 5 depicts a semiconductor diffused resistance type strain gage comprising an n-type Si substrate 1 having a resistivity of 10 ohm cm with the following applied to the substrate by appropiate deposition techniques.

(1) Germanium (Ge) as a neutral impurity atom is implanted to the entire surface of the substrate under the condition of an acceleration energy at 200 keV and with a dose of $5\times10^{15}$ cm$^{-2}$.

(2) SiO$_2$ is formed by plasma CVD process, etc, on the doping region and drive in diffusion process is applied at 1170° C. for 20 hours to form a diffused layer 10.

(3) Then, a boron (B) diffused layer 11 is formed to a predetermined configuration in the Ge diffused layer 10.

(4) Contact holes are formed in an oxide (SiO$_2$) film layer (not numbered) covering the diffused resistance body obtained by the boron diffusion, thereby forming aluminum (Al) electrodes 12.

The Ge diffused layer 10 in the semiconductor diffused resistance gage manufactured by the above steps had a surface density of about $10^{20}$ cm$^{-3}$, depth of about 1.6 $\mu$m and depth of boron diffusion layer 11 of 1.2 $\mu$m according to the secondary ion mass spectrometry method (called SIMS method).

In the case of adding the Ge doping region, another scattering mechanism (3), due to the neutral impurity atoms (Ge), is added to the scattering mechanisms (1) and (2) discussed hereinabove. It has been known that, in the case where the scattering mechanism (3) occurs solely, the neutral impurity mobility $u_N$ can be expressed by the following equation (7):

$$u_N=(3/20\cdot a_B\cdot h)\cdot(m/m^*)/(\epsilon\cdot N_N)) \tag{7}$$

wherein e is the elementary electric charge; $a_B$ is the Bohr radius (about 0.53 Å); h is the Plank constant; m* is the effective mass of positive hole or electron; m is the positive hole mass; $N_N$ is the neutral impurity density; and $\epsilon$ is the dielectric constant.

Equation (7) does not include terms undergoing effects of temperature. Accordingly, the mobility does not depend on the temperature but only on the neutral impurity density $N_N$.

Assuming that equation (7) is also valid near room temperature, positive hole mobility $u_p$, according to the invention, wherein neutral impurity atoms are added, can be represented by the following equation (8):

$$1/u_p=(1/u_L)+(1/u_I)+(1/u_N) \tag{8}$$

Equation (8) is equivalent to the case of determining a synthetic resistance composed of three resistance values connected in parallel.

In this case, when Ge is doped by $10^{19}$ in Silicon substrate and neutral impurity mobility $u_N$ is determined according to equation (7), $u_N$ shows a low value of 30.7 cm$^{-3}$/V.sec. Accordingly, since $(1/u_L)$, $(1/u_I)\leq(1/u_N)$, the positive hole mobility $u_p$ in equation (8) is represented as $1/u_p\approx1/u_N$, it is determined substantially by neutral impurities. As a result, temperature dependency also approaches the temperature dependency of the neutral impurity mobility $u_N$. The resistivity $\rho$ in this case can be represented from equations (2) and (8) as follows:

$$= 1/(e \cdot u_p \cdot P) \quad (9)$$

$$= 1/(e \cdot (u_L^{-1} + u_p^{-1} + u_N^{-1})^{-1} \cdot P)$$

$$\approx 1/(e \cdot u_N \cdot P)$$

In equation (9), since $u_N$ is a value not depending on temperature and is of low value, it can be seen that temperature dependency of the resistance value of the semiconductor resistance can be lowered without significantly decreasing resistivity $\rho$.

Figure 7:
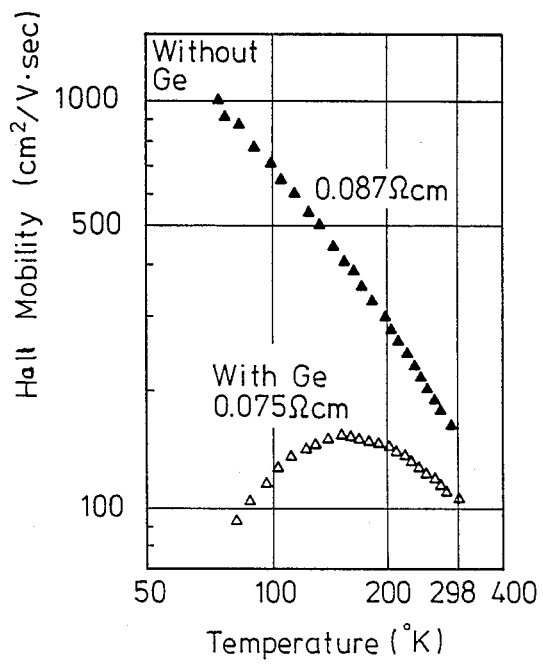
FIG. 7 is a graph depicting the relationship between the Hall mobility of positive holes and temperature.
Figure 8:
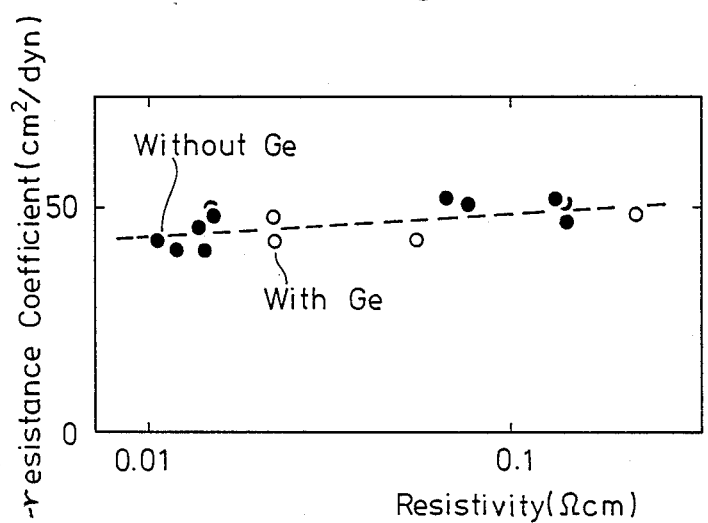
FIG. 8 is a graph depicting the relationship between piezo-resistance coefficient and resistivity.
Figure 9:
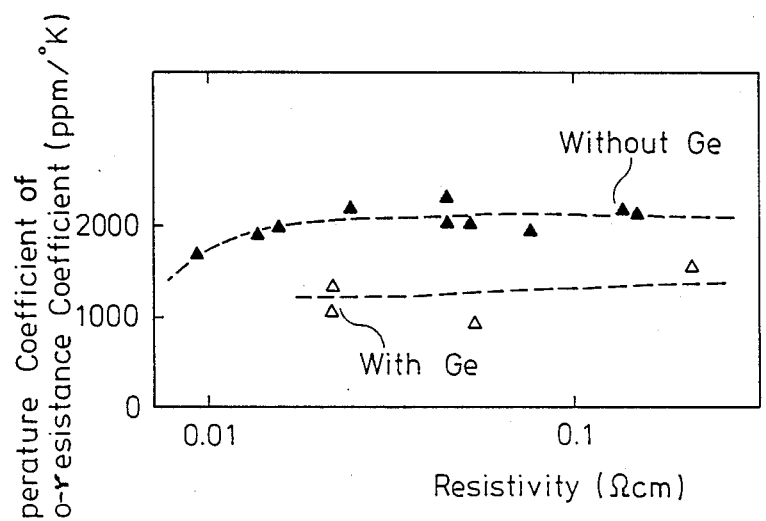
FIG. 9 is a graph depicting the relationship between temperature coefficient of piezoresistance coefficient and resistivity.

Temperature coefficient of resistivity, Hall coefficient and piezoresistance coefficient were measured for such a semiconductor diffusion strain gage and the results are those depicted in FIGS. 7, 8, 9. The resistivity of the strain gages were changed from 0.003 to 0.3 ohm cm by variing the Boron density.

Figure 6:
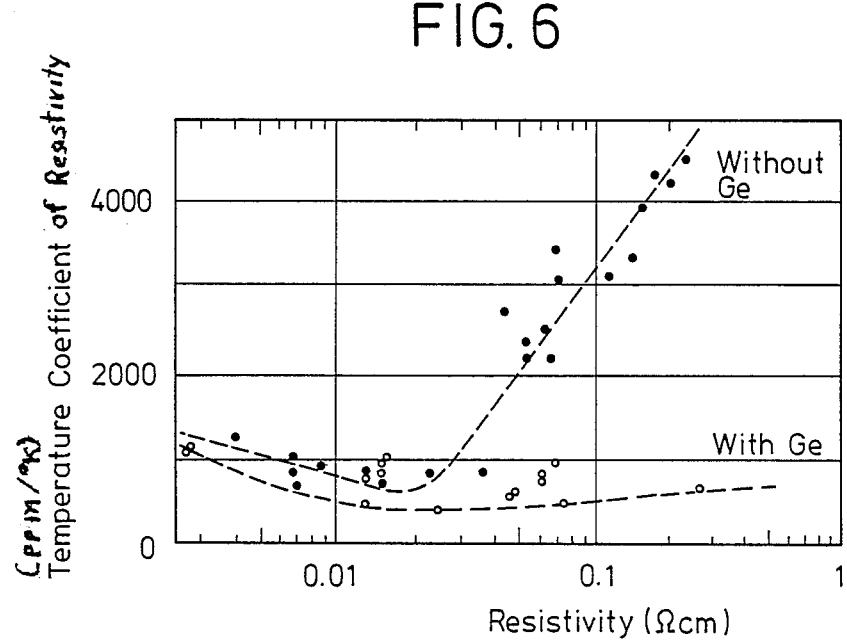
FIG. 6 is a graph depicting the relationship between temperature coefficient of resistivity and resistivity.

FIG. 6 illustrates the relationship between temperature coefficient of resistivity (ppm/° K.) and resistivity (ohm cm). The curve plotted for symbol "o" represents the results of measurements for the semiconductor diffused strain gages according to the invention. The curve plotted for the symbol "●" represents the results of measurements for a conventional semiconductor diffused strain gages. It can be seen from the graph that although the effect of Ge is insignificant if the resistivity is lower than 0.02 ohm cm, remarkable reduction is observed in the temperature coefficient of resistivity, along with the increase in resistivity, which is decreased to about ⅓, at 0.3 ohm cm.

FIG. 7 shows the relationship between temperature (° K.) and Hall mobility (cm²/V.sec). The curve ploteed for symbol "Δ" shows the results of measurements for the semiconductor diffused strain gages according to the invention. The curve plotted for the symbol "▲" shows the results of measurement for the conventional diffused strain gages. The graph shows the results of the measurement for the specimens in which the resistivity of both of the gages are substantially equal to each other (about 0.08 ohm cm). According to the graph, it can be seen that the mobility is decreased remarkably for the specimen doped with Ge according to the invention and the temperature dependency near the room temperature (about 300° K.) is generally greatly decreased.

FIG. 8 illustrates the relationship between resistivity (ohm cm) and piezoresistance coefficient (cm²/dyn), that is the sensitivity of the strain gage. The curve plotted for the symbol "o" shows the results of measurements for the semiconductor diffused strain gages according to the invention. The curve plotted for the symbol "●" shows the results of measurements for the conventional semiconductor diffused strain gages. In this test, a diffused resistance body was formed in the direction <110> on the surface of an Si substrate having the crystal plane (100) and was measured while applying an uniaxial stress in the direction of <100>. The graph shows that if a diffused resistance body is formed in the region in which Ge is diffused, the piezoelectric resistance coefficient itself suffers no significant effect.

FIG. 9 shows the results of measurements for the relationship between resistivity and temperature coefficient of piezoresistance coefficient (ppm/° K.) for the specimen used in preparing the graph of FIG. 8. The curve plotted for the symbol "Δ" shows the results of measurements for the semiconductor strain gages of the invention. The curve plotted for the symbol "▲" shows the results of measurements for the conventional semiconductor strain gages. It can be seen from the graph that if the diffused resistance body is formed in the region in which the Ge is diffused, the temperature coefficient of the piezoresistance coefficient is decreased about ½.

Although the embodiment uses Ge doped on an n-type substrate and Boron is diffused thereover, the invention is not limited to such an embodiment. For example, neutral impurities belonging to group IV, other than Ge, may be used, or alternatively, neutral impurities atoms may be doped to a p-type Si substrate, and a diffusion resistance device may be formed thereby. In addition, the manufacturing conditions are not restricted to only those steps described hereinabove to produce the embodiment described herein.

As has been described above specifically referring to the examples, accordingl to the invention, since it is possible to decrease the temperature coefficient of piezoresistance coefficient with no substantial effect on the piezoresistance coefficient and to decrease the temperature coefficient of resistivity, high accuracy can be attained for the strain gage and substantial reduction in costs for strain gages becomes possible by simplifying the temperature compensation circuits used together with such strain gages.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A semiconductor strain gage comprising a silicon substrate, wherein impurity atoms of the IV group forming neither donors nor acceptors are doped in said silicon substrate, and wherein a diffused resistance region is formed in the impurity doped region.

2. The gage of claim 1, wherein said impurity atom is germanium, and said diffused resistance region is formed of boron.

3. A method of forming a semiconductor diffused resistance type strain gage comprising the steps of
    doping germanium into a surface of a silicon substrate;
    diffusing a layer of boron into the germanium diffused layer;
    diffusing a layer of silicon dioxide on the boron layer;
    forming holes in said silicon dioxide layer; and
    forming electrodes within said holes.

* * * * *